United States Patent [19]

Reyhanloo et al.

[11] Patent Number: 5,551,988
[45] Date of Patent: Sep. 3, 1996

[54] METHOD AND APPARATUS FOR CLEANING A BREWING DEVICE, ESPECIALLY OF A COFFEE MACHINE

[75] Inventors: Shahryar Reyhanloo, Grenchen; Markus Hermann, Balsthal; Markus Anliker, Gränichen, all of Switzerland

[73] Assignee: Jura Elektroapparate AG, Niederbuchsiten, Switzerland

[21] Appl. No.: 354,125

[22] Filed: Dec. 6, 1994

[30] Foreign Application Priority Data

Dec. 15, 1993 [CH] Switzerland ............... 3752/93

[51] Int. Cl.$^6$ ............... B08B 9/00; B08B 3/04; A47J 31/60
[52] U.S. Cl. ............... 134/22.1; 134/22.18; 134/42; 134/166 R; 99/289 R
[58] Field of Search ............... 134/42, 22.1, 22.12, 134/22.18, 166 R, 169 R; 99/289 R, 300

[56] References Cited

U.S. PATENT DOCUMENTS

| | | | |
|---|---|---|---|
| 3,038,492 | 6/1962 | Suggs et al. | 137/453 |
| 3,496,861 | 2/1970 | Stahler | 99/289 R |
| 4,305,328 | 12/1981 | Kueser et al. | 99/283 |
| 5,303,638 | 4/1994 | Bunn et al. | 99/300 |
| 5,333,537 | 8/1994 | Lussi et al. | 99/289 R |

FOREIGN PATENT DOCUMENTS 0173651  3/1986  European Pat. Off..

*Primary Examiner*—Jill Warden
*Assistant Examiner*—Saeed Chaudhry
*Attorney, Agent, or Firm*—Oblon, Spivak, McClelland, Maier, & Neustadt, P.C.

[57] ABSTRACT

The cleaning of the brewing device of a coffee machine takes place in various phases. In a first phase, water is conducted out of a water tank via a water supply connection of the brewing cylinder through the outlet pipe disposed in the brewing piston into an external water tank. The cleaning water follows the route of the brewed coffee in this phase. In a second phase (see FIG. 3) the cleaning water is conducted from the brewing cylinder via channels in the wall of the brewing cylinder into areas outside the brewing cylinder and cleans, among other things, the second extension piece for the transport of the coffee grounds to the grounds container. In a third phase the water located in the brewing chamber is caused to flow out over the edge of the brewing cylinder by means of the shifting of the ejection piston. In a fourth phase a chemical or biological cleaning agent is introduced into the brewing chamber via the powder shaft, or from a cleaning agent tank, or from a water tank, or from a cartridge, water being conducted through afterwards, and this process repeated a few times. Finally there is a rinsing step.

13 Claims, 5 Drawing Sheets

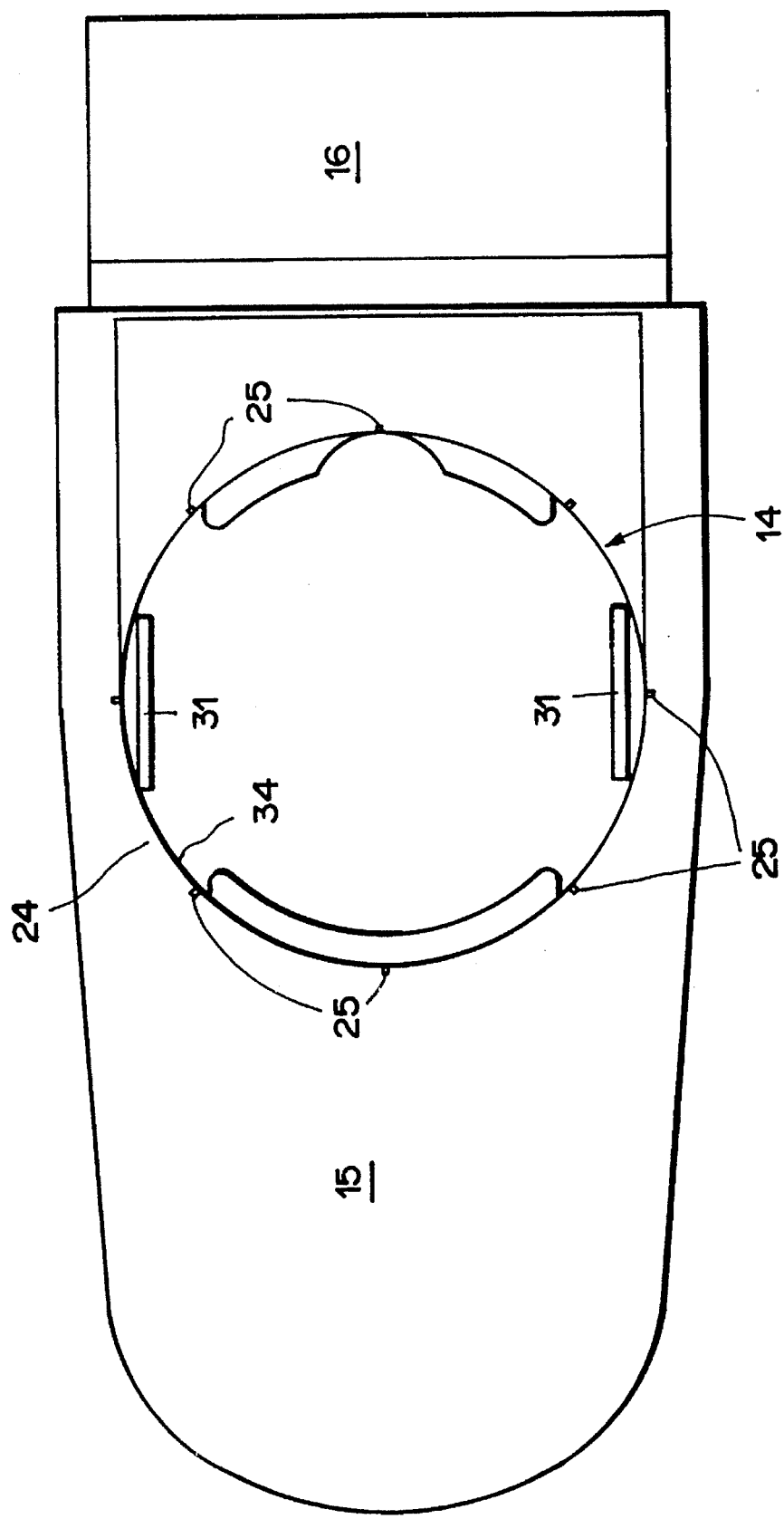

METHOD AND APPARATUS FOR CLEANING A BREWING DEVICE, ESPECIALLY OF A COFFEE MACHINE

BACKGROUND OF THE INVENTION

This invention relates to a method of cleaning a brewing device, especially of a coffee machine, and to an apparatus for cleaning such a brewing device.

DISCUSSION OF BACKGROUND

Disclosed by European patent 0 154 206 is a device for preparing hot drinks, especially coffee, which has a subrack which accepts the parts subjected to soiling by beverage powder or by the prepared drink, which subrack can be removed from the coffee machine for external cleaning.

U.S. Pat. No. 3,038,492 discloses a coffee machine in which a piston moves the coffee grounds toward an output element, the flow of water for rinsing the coffee grounds out of the cylinder being maintained. However, in this prior art apparatus, all of the parts soiled by coffee grounds or by coffee cannot be cleaned by water from the same source utilized for preparing coffee.

SUMMARY OF THE INVENTION

It is an object of the present invention to provide a coffee machine in which all the parts soiled by coffee or by coffee grounds can be cleaned inside the machine itself, and moreover using water from the same water tank or water supply as used for preparation of coffee. Other objects and advantages will become readily apparent from the description of a preferred embodiment herein.

BRIEF DESCRIPTION OF THE DRAWINGS

A preferred embodiment and its application will be described more closely in the following, with reference to the accompanying drawing in which:

FIG. 5 is a top view of the brewing chamber depicting rinsing and cleaning channels.

DESCRIPTION OF THE PREFERRED EMBODIMENT

Figure 1:
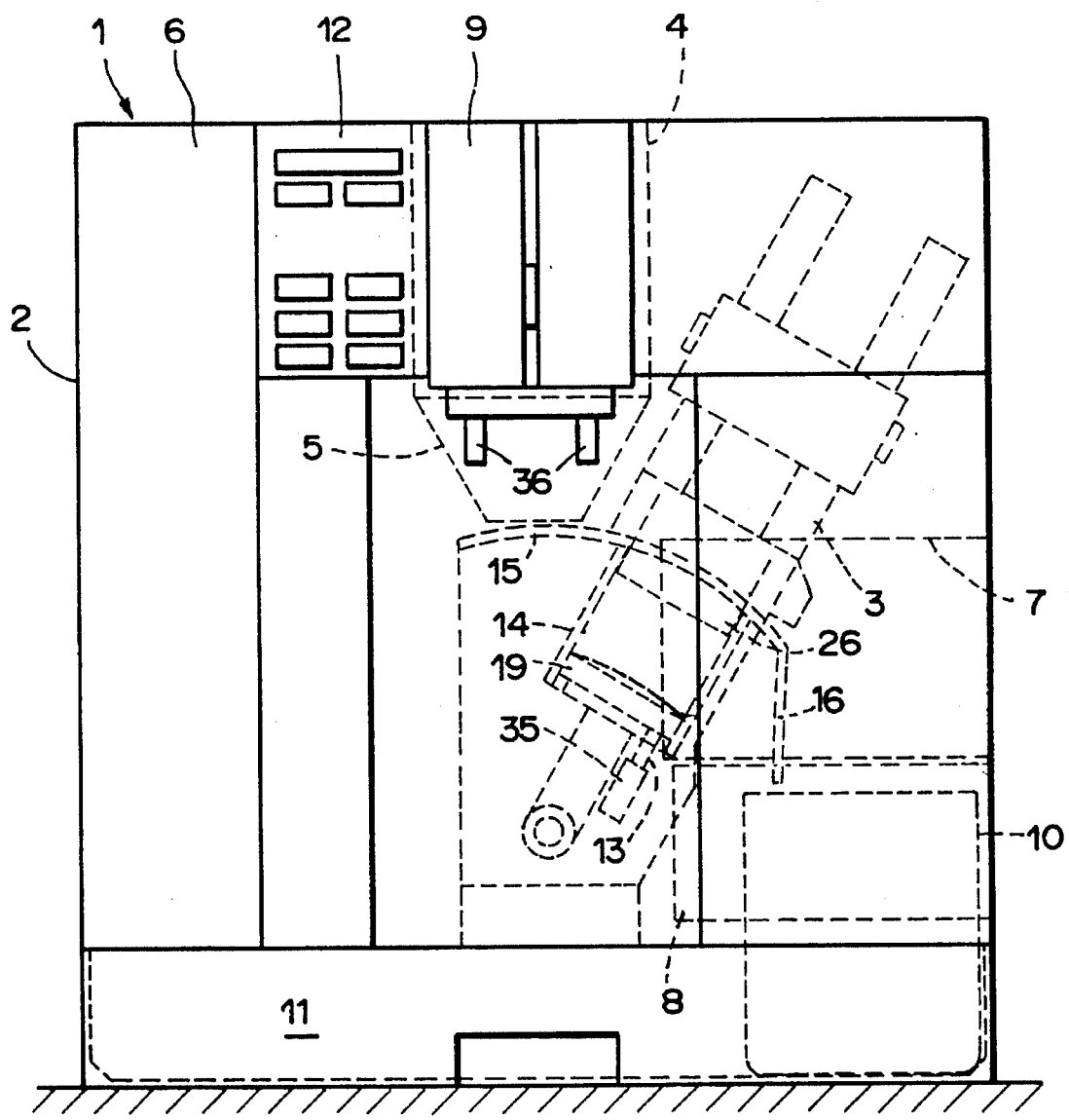
FIG. 1 is a diagrammatic view of a coffee machine with the individual components.

Referring now to the drawings, wherein like reference numerals designate identical or corresponding parts throughout the several views, as shown in FIG. 1, the coffee machine 1 includes a housing 2 with the components disposed therein, namely as the central module. The machine includes a brewing device 3, a coffee bean container with mill work 4, a funnel 5 disposed thereunder for the ground coffee powder, a water tank 6, an instantaneous water heater 7, a pump 8, a coffee outlet 9, a container for coffee grounds and a collection pan 11 for the cleaning water. A service module 12 is also provided for controlling of the operational processes of the coffee machine. The aim of the cleaning process is the cleaning of the parts of the coffee machine soiled by coffee and by coffee grounds, most of which parts are disposed in the brewing device 3. Concerning the method of operation of the brewing device 3, reference is made to U.S. Pat. No. 5,259,296.

Both the brewing water and the cleaning water are conducted from the water tank 6 through the pump 8 through the instantaneous water heater 7 to the water supply connection 13 on the brewing cylinder 14. For the process of cleaning and rinsing the brewing device, water coming from the same water tank 6 is used as for preparation of the coffee. A first extension piece 15 of the brewing cylinder covers the lower output end of the funnel 5 in the position of the brewing cylinder shown. A second extension piece 16 on the brewing cylinder 14 serves as the chute for conveying the coffee grounds expelled from the brewing cylinder into the grounds container 10. The filled coffee grounds container 10 is emptied each time prior to the cleaning procedure.

Figure 2:
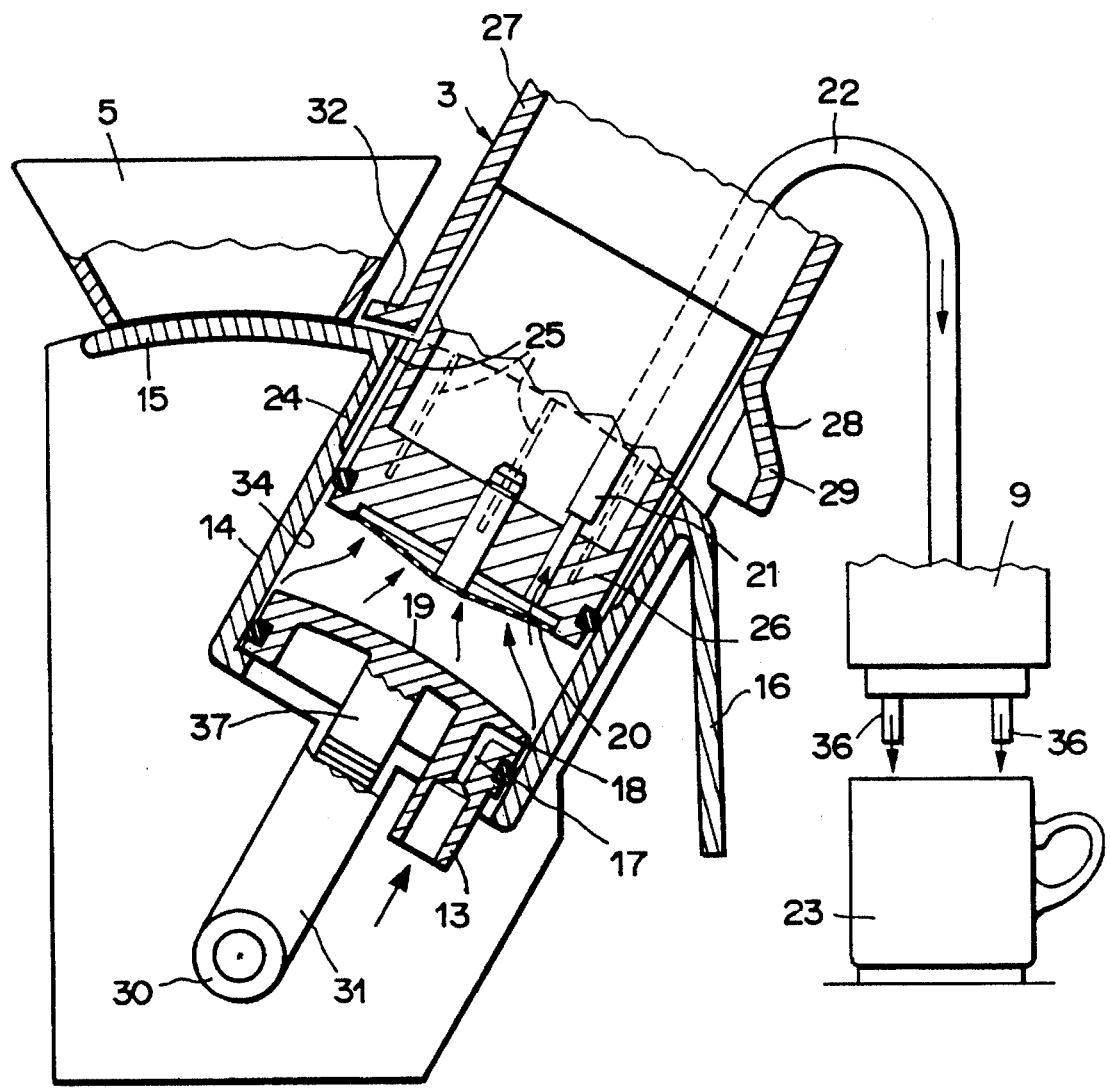
FIG. 2 is a partial cross-sectional drawing of the brewing device of the coffee machine in the rinsing position.

The rinsing position is shown in FIG. 2. The rinse water entering through the water supply connection 13 passes through a channel 17 in the outer ring area 18 of the ejection piston 19. The rinse water then passes through the sieve plate 20 into the outlet pipe 21, through the discharge line 22 and the coffee outlet 9, and then through the discharge pipes 36 to an external water tank 23. In this first cleaning step, a rinsing takes place of the parts subjected to soiling, namely the ejection piston 19, the lower area of the brewing cylinder, i.e. the brewing chamber, the sieve plate 20 on the brewing piston 26, the outlet pipe 21, the discharge line 22, and the coffee outlet 9. The rinse water in this phase takes the route of the brewing water or brewed coffee, respectively. Disposed in the wall 24 of the brewing cylinder 14 are several rinsing channels 25, for example eight, which in the first cleaning phase described here, the rinse phase, are covered over by the brewing piston 26, however, as is also the case during coffee brewing. On the guide 27 for the brewing piston 26 in the vicinity of the second extension piece 16 is a projection 28, running on a slant, and a projection 29 joined thereto, parallel to the guide for the brewing piston. The function of this projection 28 will be described in the second phase of the cleaning process.

Pivotably disposed about fulcrum 30 is a lever 31 for horizontal swinging of the brewing cylinder 14. Ejection means, not shown in detail, are also provided in the area of this lever to move the ejection piston 19 upward in brewing cylinder 14.

The route taken by the rinse water is indicated by arrows.

Figure 3:
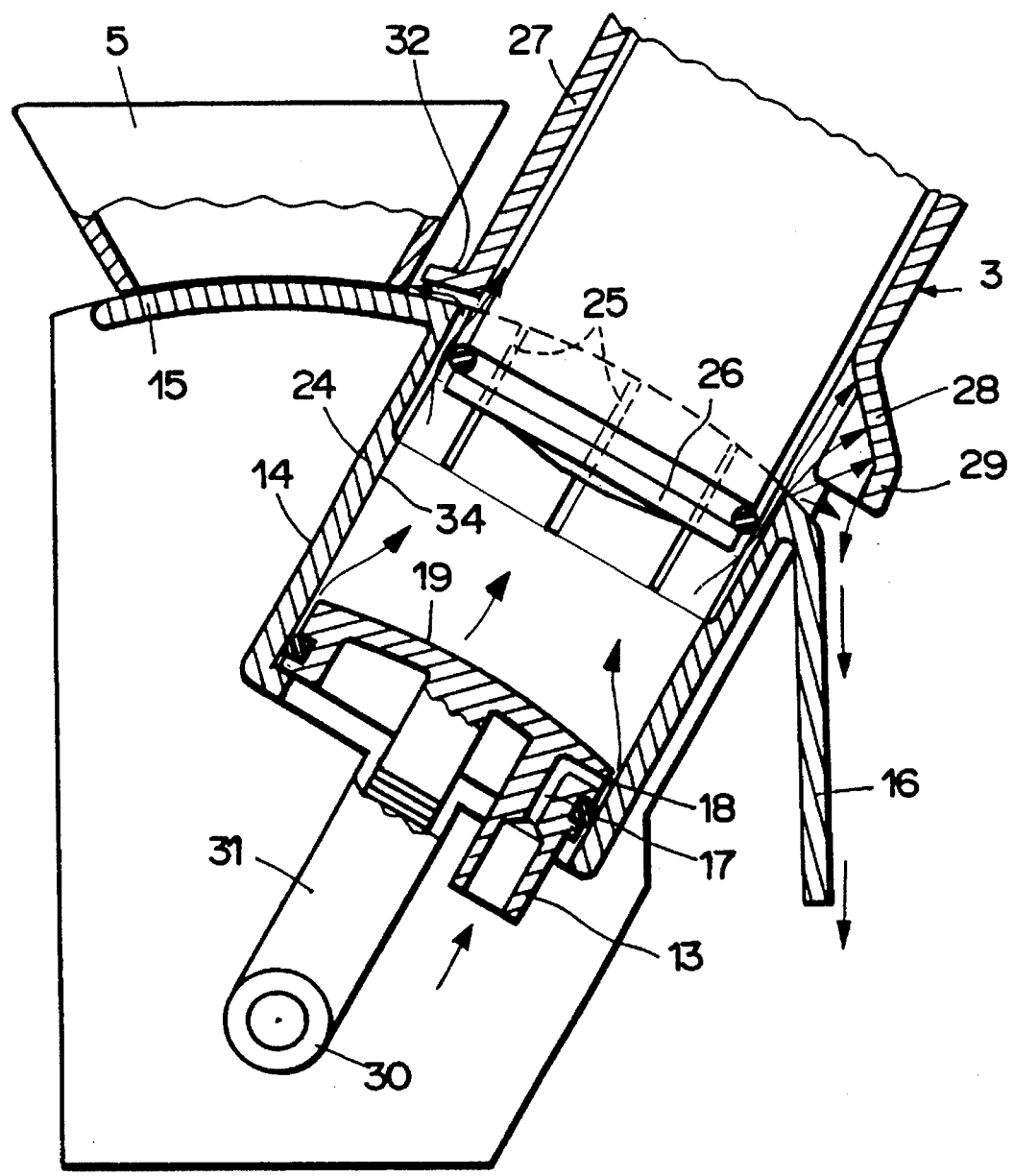
FIG. 3 is a partial cross-sectional view of the brewing device of the coffee machine in the cleaning position.

FIG. 3 shows the brewing device in the cleaning position, which represents the second phase of the cleaning process. The cleaning water flows again through the water supply connection 13 and through the channel 17 in the ring area 18 of the ejection piston 19, and from there through the rinsing channels 25 in the wall 24 of the brewing cylinder 14 into the area outside the brewing cylinder. The brewing piston 26 frees the channels 25 in the lower area, with the channels formed as grooves in the inner wall 34 of the brewing cylinder. The cleaning water sprays on the slanted projection 28 of the guide 27 for the brewing piston and from there reaches the second extension piece 16 and cleans it of coffee grounds. In addition the cleaning water coming out through the rinsing channels sprays inbetween the angular part 32 of the guide 27 for the brewing piston 26 and the first extension piece 15 of the brewing cylinder. Moreover water is sprayed upwards inbetween the inner wall of the guide 27 for the brewing piston and the brewing piston 26, as indicated in FIG. 3. As a result of the jet effect of the water coming out through the rinsing channels, particles of coffee grounds are washed away. The rinsing channels or grooves 25 can be disposed asymmetrically and can be designed differing from one another in size. The route of the rinse water is again indicated by arrows.

Figure 4:
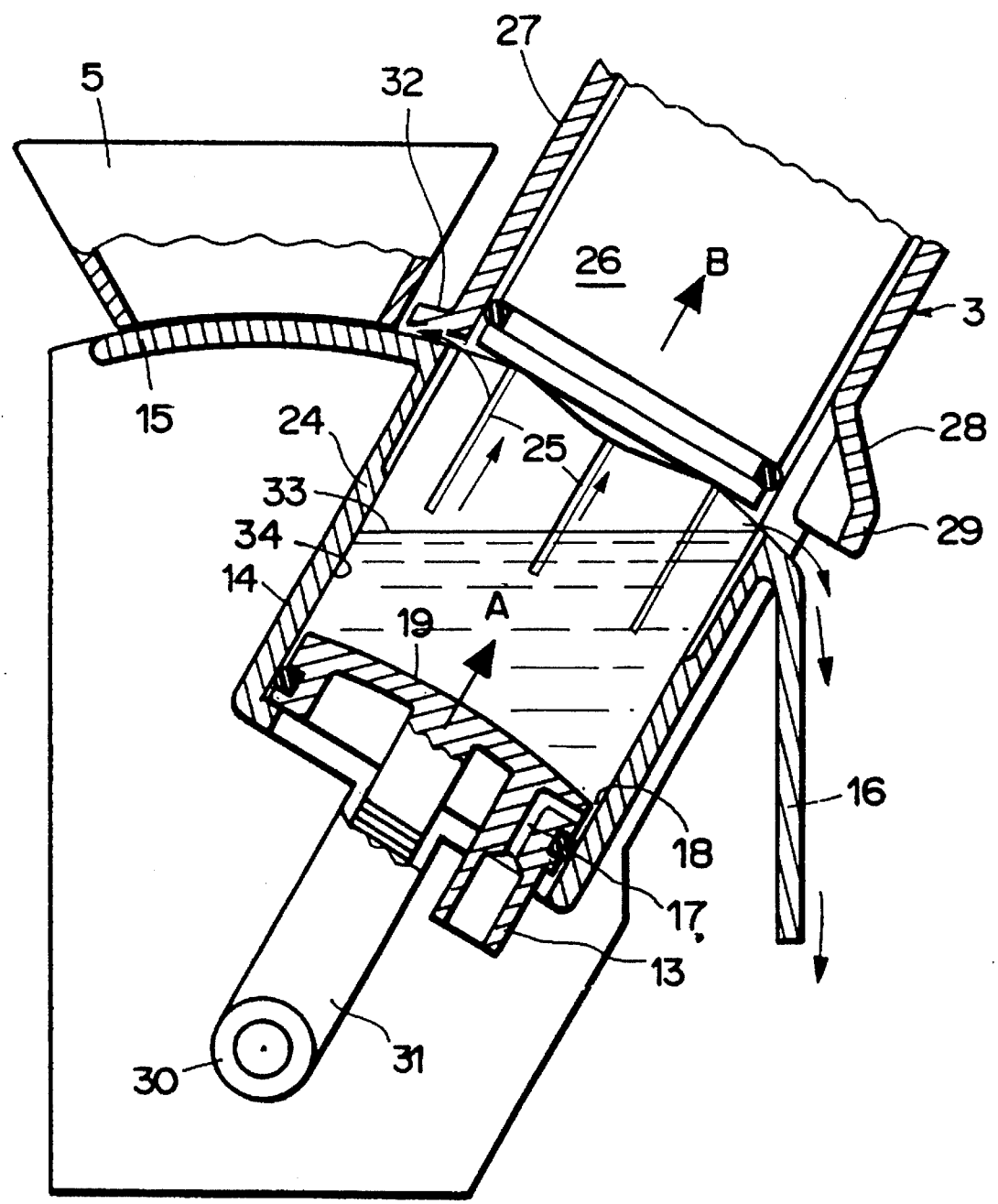
FIG. 4 is a partial cross-sectional view of the brewing device of the coffee machine in the flooded position.

The flooded state, the third phase of the cleaning process, is shown in FIG. 4. The brewing piston 26 is higher up, in a retracted position, than is the case in the phases shown in FIGS. 2 and 3. The brewing cylinder 14 is filled to the maximum possible water level via the water supply connection 13. Owing to the slanted position of the brewing cylinder, the surface of the water 33 runs on a slant with respect to the wall 24 of the brewing cylinder. During the flooding process the ejection piston 19 is pushed upward in the direction of arrow A and the brewing piston 26 in the direction of arrow B somewhat upward into the position shown so that the water flows around about, up and out of the brewing cylinder 14. The water flows down in the direction of the arrow between the projection 28 and the second extension piece 16 and between the lower angular piece 32 of guide 27 for the brewing piston and the first extension piece 15 in the direction of the funnel 5. The overflowing water takes particles of coffee grounds along with it. The various cleaning phases are triggered by control electronics disposed in the coffee machine which are put in operation by means of the service module 12.

FIG. 5 is a top view of the brewing chamber 14 with the first and second extension pieces 15 and 16 shown. The rinsing channels are designed as grooves 25 disposed in the inner wall 34 of the brewing cylinder. The rinsing channels shown in FIG. 5 are disposed symmetrically; they could also be disposed asymmetrically, however.

A chemical and/or biological cleaning can take place as a further, fourth cleaning phase. For this purpose the brewing cylinder 14 is swung into the grinding position under funnel 5, a cleaning agent in tablet, powder or liquid form being introduced into the powder shaft. Afterwards the brewing cylinder is swung back into its rinsing position as shown in to FIG. 2. After the pump has pumped water into the brewing cylinder, the cleaning agent takes effect for some time. The rinsing process is preferably repeated several times. The cleaning agent can also be brought in from a cleaning agent tank, not shown, from a water tank or from a cartridge, via valve-pump-instantaneous water heater-brewing cylinder. Following the fourth phase of chemical and/or biological cleaning, any possible residue of the cleaning agent is expelled by the ejection piston 19 in a fifth phase. The brewing piston is moved upward thereby into the position shown in FIG. 4.

After the fifth phase comes a sixth phase, which is rinsing. The brewing device remains in the position shown in FIG. 2; the pump pumps water through the system and rinses away any cleaning agent. The brewing cylinder is moved into the grinding position. At the same time the user is reminded to empty the collection pan 11.

In an embodiment not shown, the water for cleaning is taken from a fresh water supply source connected to the coffee machine.

The individual phases or steps, respectively, of the cleaning procedure can also be carried out in a different order, it being possible to omit or repeat one or several phases.

What is claimed is:

1. A method of cleaning a brewing device having at least one cleaning phase including feeding water for a cleaning process from one of a water tank and an external water supply via a supply line to a water supply connection of a brewing cylinder; and during said at least one cleaning phase feeding said water through elements of the brewing cylinder and into areas outside the brewing cylinder, wherein said elements are grooves or channels disposed on an inner surface of a wall of said brewing cylinder, and wherein feeding of said water into areas outside the brewing cylinder is accomplished by said grooves or channels disposed on the inner surface of the wall of said brewing cylinder.

2. The method of claim 1, further including feeding the water to an extension piece of the brewing cylinder for cleaning of the brewing cylinder.

3. The method of claim 1, further including providing at least one of a chemical and a biological cleaning process utilizing a cleaning agent.

4. The method of claim 3, further including a step of expelling any residue of the cleaning agent.

5. The method of claim 1, further including performing a rinsing phase.

6. A method of cleaning a brewing device having at least one cleaning phase including feeding water for a cleaning process from one of a water tank and an external water supply via a supply line to a water supply connection of a brewing cylinder; and during said at least one cleaning phase feeding said water through elements of the brewing cylinder and into areas outside the brewing cylinder;

the method further including feeding the water via the water supply connection into the brewing cylinder and from there through an outlet pipe and into a brewing piston to an external water tank while a brewing piston covers said elements of the brewing cylinder.

7. A method of cleaning a brewing device having at least one cleaning phase including feeding water for a cleaning process from one of a water tank and an external water supply via a supply line to a water supply connection of brewing cylinder; and during said at least one cleaning phase feeding said water through elements of the brewing cylinder and into areas outside the brewing cylinder;

the method further including feeding said water such that water located in the brewing cylinder flows over an edge of the brewing cylinder by raising an ejection piston and simultaneously maintaining a brewing piston in a retracted position.

8. The method of one of claims 1 to 7, further including repeating at least one cleaning steps.

9. A cleaning apparatus for a brewing device, comprising:

at least one of a water tank and an external water supply for providing a supply of cleaning water;

a supply pipe to feed the cleaning water to a water supply connection of a brewing cylinder; and a plurality of elements for conducting the cleaning water from the brewing cylinder to areas outside the brewing cylinder, wherein said plurality of elements include grooves or channels on an inner surface of a wall of the brewing cylinder.

10. The cleaning apparatus of claim 9, wherein said plurality of elements run parallel to a central axis of the brewing cylinder.

11. The cleaning apparatus of claim 9, wherein said plurality of elements are disposed asymmetrically.

12. The cleaning apparatus of claim 9, wherein said plurality of elements are of differing size.

13. A cleaning apparatus for a brewing device, comprising:

at least one of a water tank and an external water supply for providing a supply of cleaning water;

a supply pipe to feed the cleaning water to a water supply connection of a brewing cylinder; and a plurality of elements for conducting the cleaning water from the brewing cylinder to areas outside the brewing cylinder;

the apparatus further including a projection provided for conducting a rinse water to an extension piece, said extension piece extending from the brewing cylinder, and wherein said projection is adjacent to the extension piece, and said projection is disposed on a guide for the brewing cylinder.

* * * * *